United States Patent [19]
Chang

[11] Patent Number: 5,809,135
[45] Date of Patent: Sep. 15, 1998

[54] PRESS LOCKING CONNECTOR FOR ANTENNA OF A MOBILE-PHONE

[75] Inventor: Daniel Chang, Pa-Te, Taiwan

[73] Assignee: Auden Technology Mfg. Co., Ltd., Tao-Yaun Hsien, Taiwan

[21] Appl. No.: 798,965

[22] Filed: Feb. 11, 1997

[51] Int. Cl.$^6$ .............................. H04M 1/00; H01R 29/00; H01R 9/09; H01Q 1/12
[52] U.S. Cl. .................. 379/433; 379/434; 379/428; 455/575; 455/90; 455/129; 343/892; 439/54; 439/58; 439/61; 439/82
[58] Field of Search ................... 439/58, 61, 54; 455/90, 129, 575; 343/892; 379/433, 428, 434

[56] References Cited

U.S. PATENT DOCUMENTS 5,524,284   6/1996   Marcou et al. ...................... 455/129

Primary Examiner—Krista Zele
Assistant Examiner—Charles N. Appiah
Attorney, Agent, or Firm—Pro-Techtor International Services

[57] ABSTRACT

A press locking connector for the antenna of a mobile-phone, the connector is more suitably connected to the antenna of a car and a mobile-phone and is formed a sheet member having at the upper portion thereof a collar with a diameter size coincident with that of the shaft of the antenna, the collar has an opening of suitable size; a hook is provided beside and at a slightly lower portion from the collar, a plug contact device is inserted in a through hole near the bottom of the sheet member, so that the collar opening can be aligned with the antenna and is clamped by a force exerted forwardly from behind on the shaft of the mobile-phone, the hook will snap hook into a recess provided on the top of the mobile-phone, the plug contact device is connected to a socket contact on the mobile-phone by a force exerted in one single direction.

3 Claims, 5 Drawing Sheets

PRESS LOCKING CONNECTOR FOR ANTENNA OF A MOBILE-PHONE

BACKGROUND OF THE INVENTION

1. Field of the Invention

The present invention relates to a press locking connector for the antenna of a mobile-telephone, and especially to a connector which can be more fixedly connected to the antenna of a car and a mobile-telephone, and by which locking thereof can be easier and more convenient.

2. Description of the Prior Art

In order to improve receiving capability of a mobile-telephone in a car, a connector has been used to connect the antenna for the mobile-telephone and the antenna for the car. However, the antenna for the mobile-telephone is provided on the top surface as a protruding post, hence the connectors now available is not so convenient in use.

Take the conventional pen cap shaped connector as an example such as is shown in FIG. 1, which connector is provided with a sleeve 12 in a shape and a size corresponding to that of the antenna of a mobile-telephone, a press piece 13 is integrally provided at the lateral side of the sleeve 12, the sleeve 12 can be fitted over the antenna 11 of the mobile-telephone, a plug contact 14 provided on the press piece 13 is used to contact a mating socket contact 16 provided on the back surface 15 of the mobile-telephone 10, so that the whole mobile-telephone 10 can be connected with the antenna of a car to enhance receiving capability thereof.

However, in such a conventional connector structure, the sleeve 12 is loosely connected with the antenna 11 of the mobile-telephone, when a force is exerted to take it off for using the mobile-telephone, loosening often induces, such structure is quite unstable and thus is disadvantageous. Moreover, when in assembling of the whole connector, the sleeve 12 is fitted over from above, while the plug contact 14 on the press piece 13 must be pressed forwardly from behind into the socket contact 16 provided on the back surface 15 of the mobile-telephone 10, exerting direction of the two assembling forces are not consistent with but are perpendicular to each other, this makes uneasy as well as inconvenient exertion of press connecting forces, after the sleeve 12 is fitted over the antenna 11 of the mobile-telephone, unless the press piece 13 integrally formed with the sleeve 12 in an arciform bending shape is precisely manufactured, the plug contact 14 on the press piece 13 generally is not in the same level as that of the socket contact 16 provided on the mobile-telephone 10, thereby a defect of uneasy to get alignment is existed. Besides, if such connector parts has any little error in sizes after manufacturing, and alignment is forcedly made, by elasticity provided by the press piece 13, the plug contact 14 and the socket contact 16 are subjected to loosening and separating, thus they are not desired.

SUMMARY OF THE INVENTION

The primary object of the present invention is to provide a press locking connector for the antenna of a mobile-telephone, it is provided with a sheet member shaped in conformity to the back surface of the connecting portion of the mobile-telephone; the sheet member is provided at the upper portion thereof with an opened collar of suitable size, and is provided at a slightly lower portion thereof with a hook, a through hole is provided near the bottom of the sheet member for connection of a plug contact device, so that the collar and the hook of the sheet member can be connected to the antenna of the mobile-telephone and to a recess provided on the top of the mobile-telephone.

A further object of the present invention is to provide a press locking connector for the antena of a mobile-telephone, wherein the sheet member can be assembled on the mobile-telephone all in one direction, i.e., from behind to the front, so that compressing connection therefor can be more easy and convenient.

The present Invention will be apparent in its novelty and other characteristics after reading the detailed description of the preferred embodiment thereof in reference to the accompanying drawings.

DETAILED DESCRIPTION OF THE PREFERRED EMBODIMENT

Figure 1:
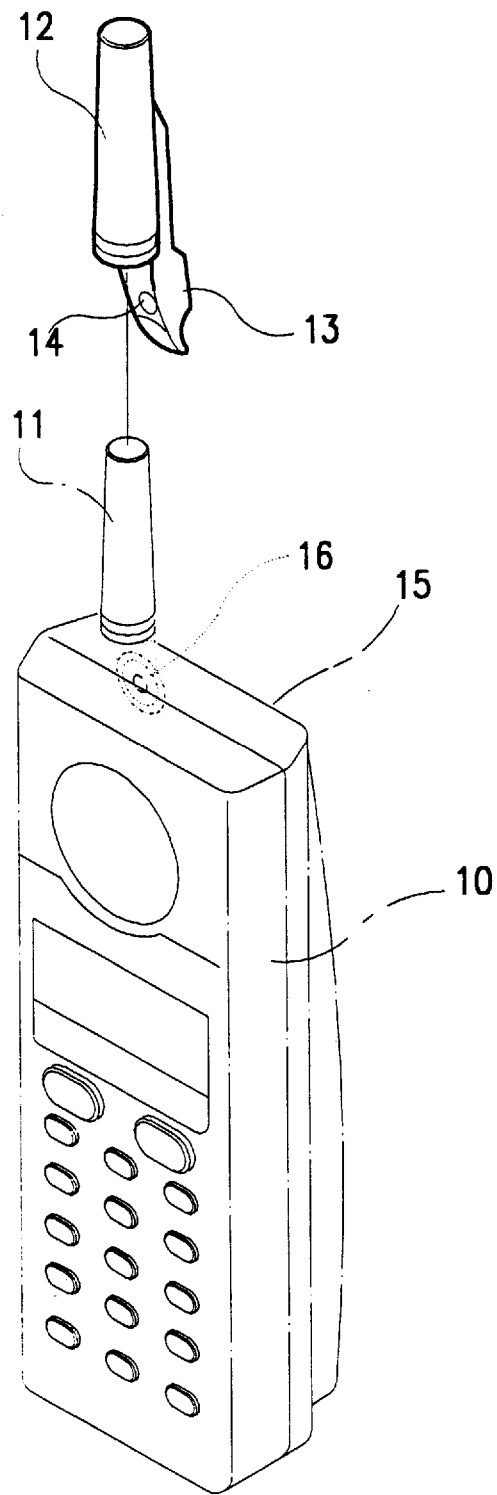
FIG. 1 is a schematic perspective view of the conventional connector of a mobile-telephone.
Figure 2:
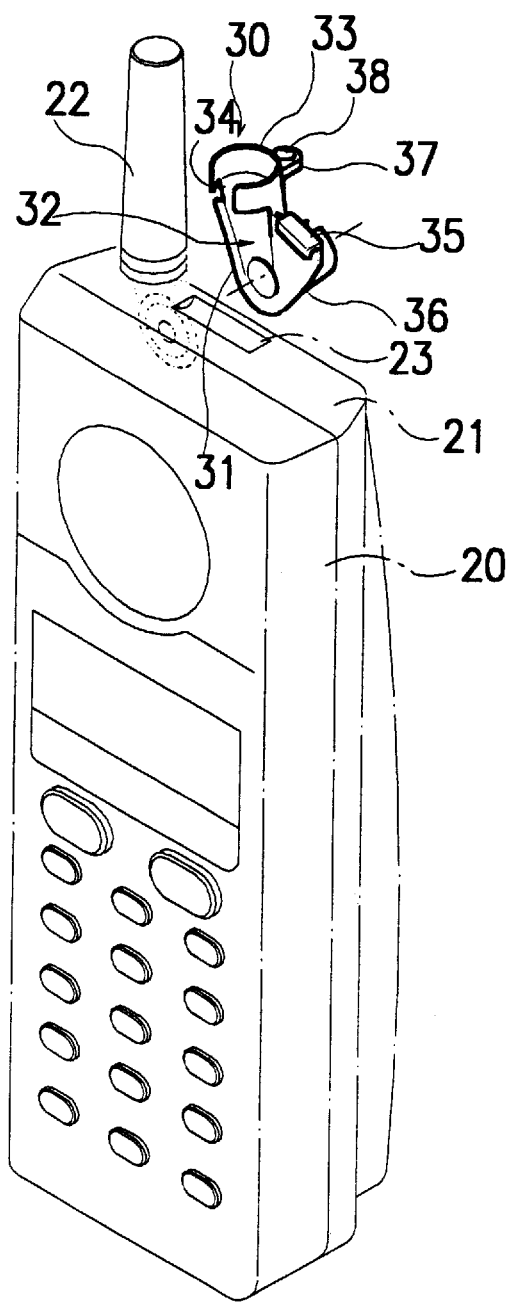
FIG. 2 shows allocation of the preferred embodiment of the present invention on the mobile-telephone.

Referring to FIG. 2, take the mobile-telephone 20 shown as an example, it is provided on the top 21 thereof with an antenna 22 in the shape of a short post, on the same top 21 and beside the antenna 22, there is a recess 23 having suitable horizontal length.

Figure 3:
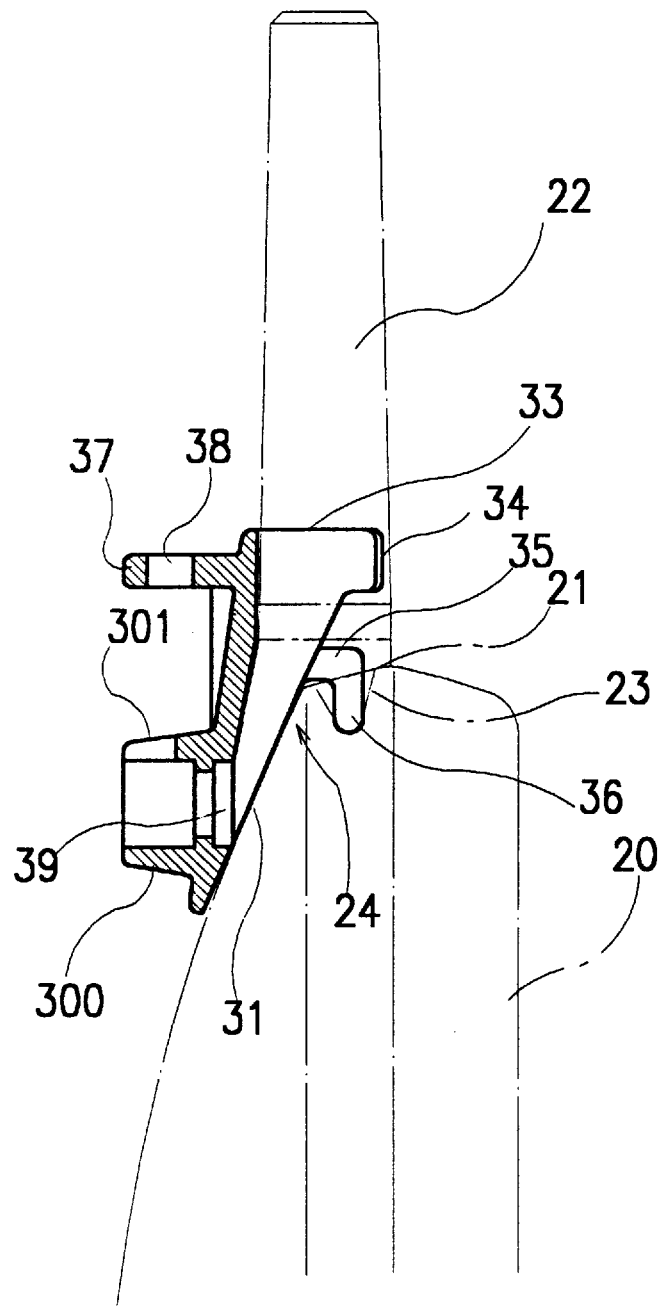
FIG. 3 is a sectional view of the embodiment shown in FIG. 2 after assembling.

In the preferred embodiment, the connector of the present invention is formed a sheet member 30, referring to FIG. 2 and 3, the lateral surface 31 and the arciform surface 32 of the sheet member 30 can all be in conformity to the shape of the back surface of the connecting portion 24 of the mobile-telephone.

The sheet member 30 is provided at the upper portion thereof with a collar 33 having a diameter size coincident with that of the antenna 22, the collar 33 is provided at the front thereof with an opening 34 of suitable size. A hook 35 is provided beside and at a slightly lower portion from the collar 33, the hook 35 is provided with a hook end 36 which is formed by bending the hook 35 to a right angle twice serially in the embodiment shown.

As shown in FIG. 3, an extension 37 is provided on the back surface of the collar 33, and a hole 38 is formed on the extension 37. a through hole 39 is provided near the bottom of the sheet member 30 for connection to and in consistent with the position of a socket contact (not shown) on the back of the mobile-telephone 20. A hollow axle pipe 300 is extended from the back of the sheet member 30 and located oppositely to the through hole 39, an open slot 301 is formed on the top of the axle pipe 300.

Figure 5:
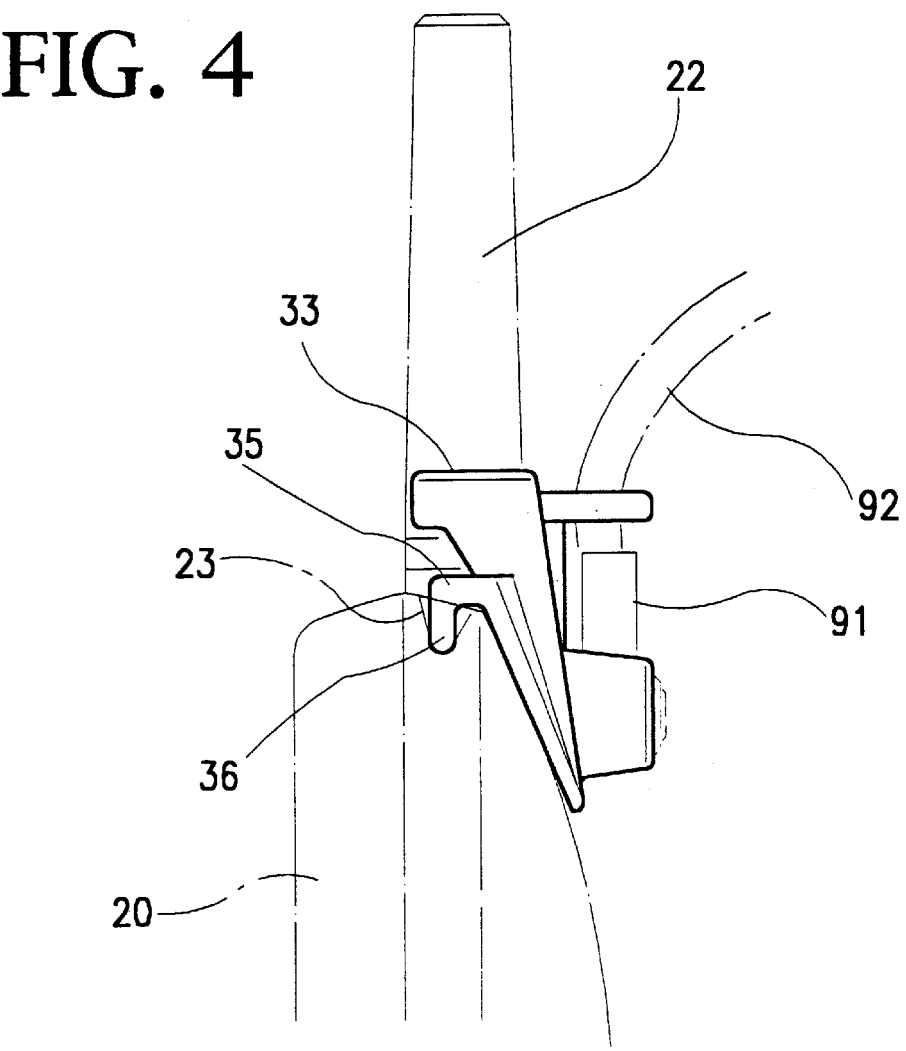
FIG. 5 is a side view of the embodiment shown in FIG. 3 having been inserted therein a plug contact device.
Figure 6:
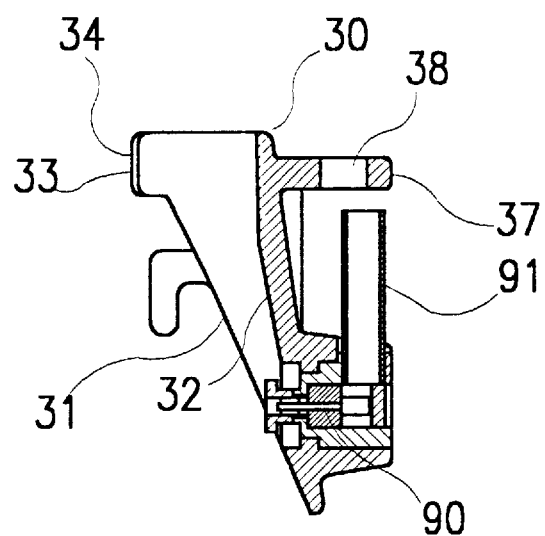
FIG. 6 is a sectional view of the embodiment shown in FIG. 5 having been inserted therein the plug contact device.

Referring to FIG. 6, a plug contact device 90 is inserted in the hollow axle pipe 300, a conduit 91 is extended out of the open slot 301 formed on the top of the axle pipe 300, a conductor 92 (also referring to FIG. 5) can be pull out through the conduit 91 and the above mentioned hole 38 for connection to an antenna of a car.

Figure 4:
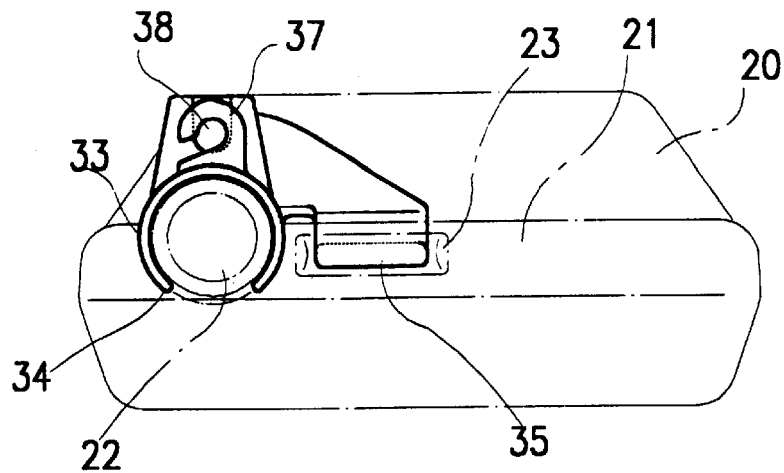
FIG. 4 is a top view of the embodiment shown in FIG. 3.

Referring to FIG. 2, 3 and 4, when in connection of the present invention with the mobile-telephone 20, the opening 34 of the collar 33 is aligned firstly with the antenna 22, then press forwardly from behind to spread the whole collar 33, and clamp the shaft of antenna 22 by the elastic retoring force of the collar 33 itself. Meantime, the hook end 36 of the hook 35 beside the collar 33 moves forwardly and slightly raisedly due to the pressing force in this pressing process along the top surface of the recess 23 of the mobile-telephone, and will snap hook into the recess 23 when the hook end 36 reaches the recess 23.

In addition to that the whole connector can be connected to the mobile-telephone 20 more firmly, the plug contact device 90 as shown in FIG. 6 is directly connected to the corresponding socket contact with a force exerted in one single direction forwardly from behind during the pressing process, so that operation for them can be more easy and convenient.

In conclusion, the press locking connector for the antenna of a mobile-telephone of the present invention is brand-new in the whole space style thereof as to the connection device for an antenna of a mobile-telephone of the same kind, and in view of the larger firmness after assembling and uneasiness of being loosened and convenience in pressing connecting thereof, improveness in relating to effect thereof is evident.

Having thus described my invention, what I claim as new and desire to be secured by letters patent of the United States is:

1. A press locking connector for an antenna of a mobile-telephone that connects said antenna of said mobile-telephone to an antenna of a car comprising:

a sheet member provided at an upper portion thereof with a flexible collar having an interior channel with a diameter equal; to that of a shaft of the antenna of the mobile-telephone, said collar includes an axial opening therein such that said collar does not define an enclosed space.

said sheet member further includes a hook, a plug contact device is inserted in a through hole provided near the bottom of said sheet member, so that said opening of said collar can be aligned with said shaft of the antenna of the mobile-telephone, said collar being pressed onto the shaft of the antenna of the mobile-telephone such that said connector is secured to said antenna of said mobile-telephone, said hook being received in a recess provided on a top of the mobile-telephone to further secure said connector, said plug contact device is connected to a socket contact on the mobile-telephone.

2. The press locking connector as defined in claim 1, wherein:

said hook is provided with a hook end formed by bending an end of said sheet member at two serial right angles.

3. The press locking connector as defined in claim 1, wherein:

an extension with a hole is provided on a back surface of said collar, a hollow axle pipe is extended from said through hole to receive said plug contact device, an open slot is formed on the top of said axle pipe to provide a path for a conductor through a conduit and said hole of said extension to connect said antenna of said mobile-telephone to said antenna of a car.

* * * * *